(12) United States Patent
Gottesman

(10) Patent No.: US 7,541,592 B2
(45) Date of Patent: Jun. 2, 2009

(54) CODED APERTURE COMPTON TELESCOPE IMAGING SENSOR

(75) Inventor: Stephen R. Gottesman, Baltimore, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 0 days.

(21) Appl. No.: 11/858,312

(22) Filed: Sep. 20, 2007

(65) Prior Publication Data

US 2009/0008565 A1    Jan. 8, 2009

Related U.S. Application Data

(60) Provisional application No. 60/948,449, filed on Jul. 7, 2007.

(51) Int. Cl.
*G01T 1/24* (2006.01)
*G01T 1/161* (2006.01)

(52) U.S. Cl. .................... 250/370.06; 250/363.06

(58) Field of Classification Search ............ 250/370.09, 250/370.08, 363.03, 363.06, 363.1, 394, 250/370.06; 378/2
See application file for complete search history.

(56) References Cited

U.S. PATENT DOCUMENTS

| 5,036,546 A | 7/1991 | Gottesman et al. | |
| 5,606,165 A * | 2/1997 | Chiou et al. | 250/363.06 |
| 6,484,051 B1 * | 11/2002 | Daniel | 600/436 |

FOREIGN PATENT DOCUMENTS

FR    WO 2007/147957 A1 * 12/2007

OTHER PUBLICATIONS

E.E. Fenimore and T.M. Cannon, "Coded Aperture Imaging with Uniformly Redundant Arrays," Appl. Opt. 17, 227 (1978).
S.R. Gottesman and E.E. Fenimore, "New Family of Binary Arrays for Coded Aperture Imaging," Appl. Apt. 28, 4344 (1989).
S.R. Gottesman and E.J. Schneid, "PNP—A New Class of Coded Aperture Arrays," IEEE Trans. on Nucl. Sci. col. 33, 745 (1986).
extract from Report of the Gamma Ray Astronomy Program Working Group Apr. 1997, Goddard Space Flight Center, NASA, URL: http://heasarc.gsfc.nasa.gov/docs/cgro/epo/brochures/grapwg/grapwg37.html (2 pp).
Gamma-ray Detectors, URL: http://www.airynothing.com/high_energy_tutorial/detection/detection05.html (4 pp) (Jul. 2007).
Coded Aperture Imaging in High-Energy Astronomy, Goddard Space Flight Center, NASA, URL: http://astrophysics.gsfc.nasa.gov/cai/ (12 pp) (Mar. 2006).

* cited by examiner

*Primary Examiner*—David P. Porta
*Assistant Examiner*—Faye Boosalis
(74) *Attorney, Agent, or Firm*—Marsteller & Associates, P.C.

(57) ABSTRACT

A combined format gamma-ray detector (D) for measuring impinging gamma-rays (10) includes an active upper level coded aperture detector plane member (12) that is suitable for detecting an impinging gamma-ray (10). An active lower level gamma ray detector plane member (14) that is spaced apart from the upper level coded aperture (12) detects an impinging gamma-ray (10). At low gamma-ray energies, the combined format gamma-ray detector device (D) operates as a conventional coded aperture system and at higher gamma-ray energies, the combined format gamma-ray detector device operates as a Compton scattering detector device.

12 Claims, 2 Drawing Sheets

CODED APERTURE COMPTON TELESCOPE IMAGING SENSOR

CROSS REFERENCE TO RELATED APPLICATIONS

This application claims the benefit of U.S. Provisional Application Ser. No. 60/948,449, filed Jul. 7, 2007, entitled CODED APERTURE COMPTON TELESCOPE IMAGING SENSOR.

BACKGROUND OF THE INVENTION

1. Technical Field

The invention relates to the field of gamma-ray detectors, and more particularly to detectors based on Compton scattering.

2. Background Art

There are presently two main design formats for gamma-ray imaging detectors or telescopes: coded aperture mask or Compton scattering configurations.

Coded aperture detectors, such as that taught in U.S. Pat. No. 5,036,546 to Gottesman, et al., have been used to image gamma-ray sources, but do not perform well above 0.3 MeV of energy due to the radiation punching through the aperture either by having no interaction or Compton scattering within the aperture and then depositing the remainder of its energy at the detector plane, thus making the aperture "optically thin" or transparent thereby destroying the system's energy resolution and contrast. This degrades and eventually destroys the image, but the image degradation can be mitigated by adding thickness to the aperture, which additional thickness in turn carries a severe weight penalty and also distorts the image.

Another known approach is to make the coded aperture out of solid state, active detector material, such as from germanium (HPGe) or cadmium-zinc-telluride (CdZnTe) or scintillator such as sodium iodide (NaI) or cesium iodide (CsI), and use the signal that is generated whenever a gamma-ray interacts in the aperture as a veto pulse, essentially instructing the signal processing electronics to ignore the event. However, this results in a significant loss of detection efficiency.

Therefore, coded apertures are rarely used to image gamma-rays above 0.3 MeV when Compton scattering becomes significant.

The second major gamma-ray telescope design comprises Compton scattering telescopes, which utilize the Compton scattering effect that happens when a photon interacts with an electron. The energies of the outgoing photon and electron, along with the angle at which the scattered photon leaves the point of interaction, allow determination of the energy and direction of the original photon or gamma-ray to within a circular cone.

A Compton scattering telescope consists of two detector planes, each level consisting of gamma-ray detecting material such as scintillator (i.e. NaI or CsI), or a solid state detector (i.e. HPGe or CZT). Information from the detectors at both planes is used to determine the interaction points in the two planes and the energy deposited in the detectors at both.

While the above cited references introduce and disclose a number of noteworthy advances and technological improvements within the art, none completely fulfills the specific objectives achieved by this invention.

DISCLOSURE OF INVENTION

In accordance with the present invention, a combined format gamma-ray detector for measuring impinging gamma-rays includes an active upper level coded aperture detector member that is suitable for detecting an impinging gamma-ray. An active lower level gamma ray detector plane member that is spaced apart from the upper level coded aperture detects an impinging gamma-ray. At low gamma-ray energies, the combined format gamma-ray detector device operates as a conventional coded aperture system and at higher gamma-ray energies, the combined format gamma-ray detector device operates as a Compton scattering detector device.

These and other objects, advantages and preferred features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

Figure 1:
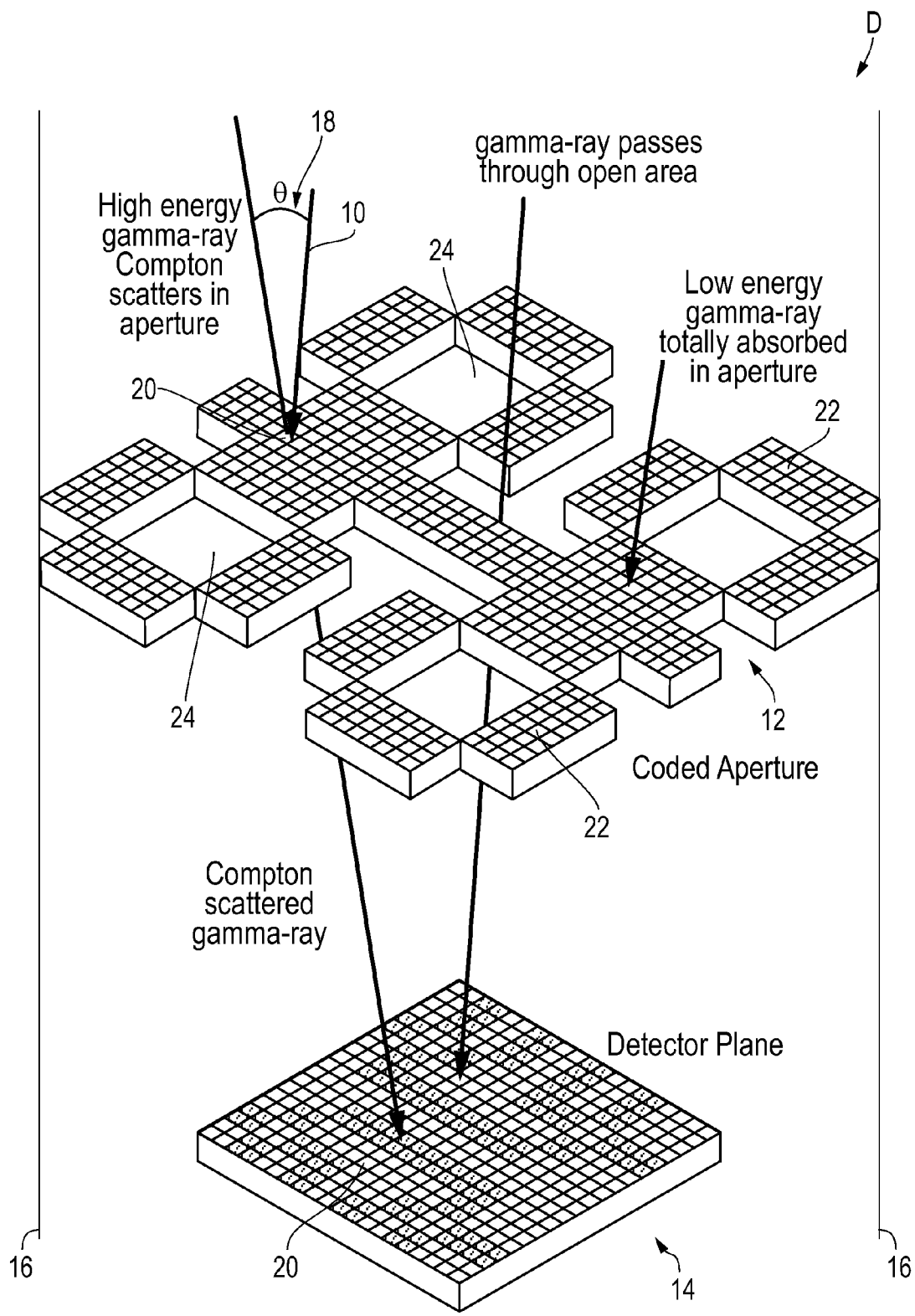
FIG. 1 is a schematic illustration of a coded aperture Compton telescope imaging sensor of the present invention.

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

In summary, a combined format gamma-ray detector D for measuring impinging gamma-rays 10 includes an active upper level coded aperture detector plane member 12 that is suitable for detecting an impinging gamma-ray 10. An active lower level gamma ray detector plane member 14 that is spaced apart from the upper level coded aperture layer 12 also is capable of detecting an impinging gamma-ray 10. At low gamma-ray energies, the combined format gamma-ray detector device D operates as a conventional coded aperture system and at higher gamma-ray energies, the combined format gamma-ray detector device operates as a Compton scattering detector device.

The present invention D uses two active detector planes, spaced-apart levels 12, 14 in a housing 16, with an upper or forward level 12 being an active coded aperture detector (scintillator or solid state) and the lower or rearward level 14 being an active scintillator or solid state detector plane. The active lower level gamma ray detector plane member 14 is arranged within the gamma ray detector D such that the active upper level coded aperture detector member 12 is ahead of the active lower level gamma ray detector plane member 14 relative to a path of travel for the gamma ray 10.

The coded aperture 12 and the detector plane element 14 may both be made out of active detector material such as cadmium-zinc-telluride (CdZnTe), or crystal scintillator (CsI, NaI), or a liquid scintillator. However, instead of throwing out the Compton scattered events whenever such an event generates a signal, the Compton scattered events are now exploited by processing the data in a Compton telescope mode, recording both position and location of the gamma-ray's interaction in the aperture as well as the detector plane.

It is well known in the art how to process Compton scattered photons to deduce the angle of arrival 18 of the photon to within an angular cone, but the present invention combines the use of an active coded aperture 12 with the Compton scattering absorption plane member 14. The advantage of the combination of the present invention D is that at low energies where the probability of Compton scattering is zero or negligible, the system D of the present invention is used in the conventional coded aperture mode (signal only from detector plane), giving a very good image at the low energies. Yet, whenever a Compton scattering event is detected (coincident signals in both the aperture and detector plane layers 12, 14), the processing is done in "Compton scatter" mode. The result is a light-weight imaging sensor that works well at both the low and high energy regimes, something that until now has never been achieved.

Conventional coded aperture systems will benefit from the present invention because they no longer will be restricted to low (<0.3 MeV) energies, or, to extend the energy range will no longer need to thicken the aperture.

The present invention includes a known type of coded aperture detector 12 to image gamma-radiation 10, but instead of constructing the aperture out of passive attenuating material such as lead (Pb) or tungsten (W), the aperture layer 12 is preferably constructed out of solid state detectors such as CdZnTe or CsI or NaI or any other gamma-ray detector material, and operates in two modes:

(a) at low energies (<0.3 MeV) the system operates as a conventional coded aperture system, or (b) at higher energies (0.3 MeV<E<5 MeV) it operates as a Compton telescope.

The approach of the present invention eliminates all the problems associated with making the aperture thick, and therefore very heavy, for the high energy gamma-rays, and improves efficiency by operating as a Compton telescope at the higher energies.

Figure 2:
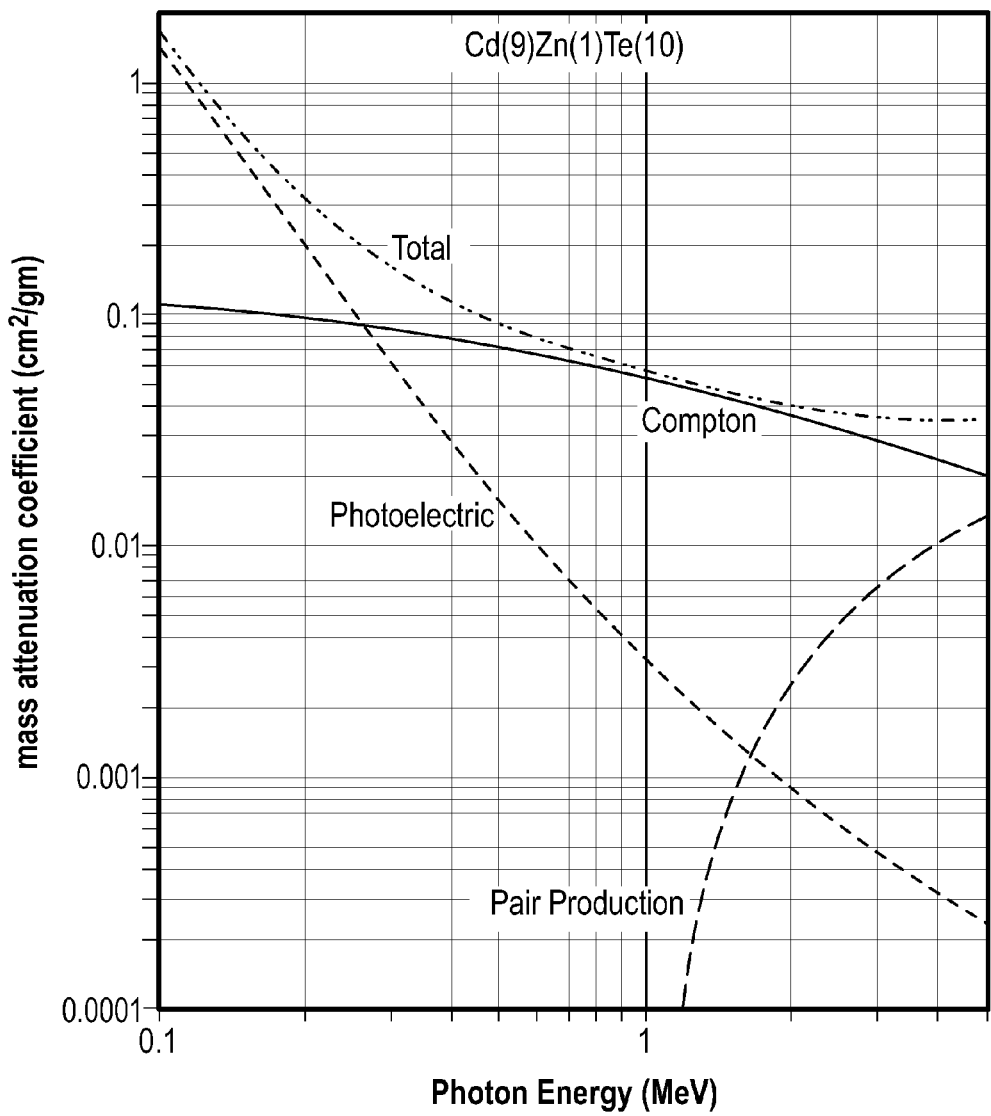
FIG. 2 is an exemplary chart of mass attenuation coefficient versus photon energy for cadmium-zinc-telluride.

FIG. 1 illustrates the present invention. The aperture 12 is an active 'coded' aperture made of a gamma-ray detecting material. Coded apertures are usually constructed of passive material, but the coded aperture 12 of the present invention D is 'active' in that it reports the location of all gamma-ray interactions in the aperture 12 as well as the energy deposited. Since the photoelectric cross section is large at low gamma-ray energies (<0.3 MeV), most gamma-rays incident on the aperture in this energy regime will interact via the photoelectric effect and be completely absorbed in the aperture 12; whereas, those passing though the open areas will interact in the detector plane layer 14 below the aperture and be completely absorbed there. This forms a shadow of the aperture 12 with good contrast which is the basic principle of the traditional coded aperture design. However, the photoelectric cross section falls off sharply with photon energy whereas the Compton falls off gradually and hence becomes dominant above 0.3 MeV. See FIG. 2. Eventually the pair production cross section becomes significant, but not until above 5 MeV. Hence, gamma-ray photons of energy between 0.3 and 5 MeV will interact predominantly through the Compton effect.

The lower or rearward detector plane element 14 may also consist of any material capable of detecting the energy of interacting gamma rays such as CdZnTe, CsI or NaI or any other gamma-ray detector material. The detector plane member 14 and associated functional components (not shown) also must be capable of detecting or recording the interaction point 20 of the impinging gamma ray 10 and detecting the amount of energy deposited by the gamma ray 10 on the detector plane element 14 similar to that of the coded aperture detector level or layer 12.

At 1.022 MeV the pair production threshold is reached and eventually will dominate, but in the intermediate region (0.3 MeV<E<5.0 MeV) the Compton cross section will be significant. When an incident gamma ray Compton scatters in the upper coded aperture layer 12, the energy it deposits in the aperture layer 12 is measured as well as the location of the interaction 20. The scattered gamma-ray will have a probability of scattering into the detector plane 14 below the aperture 12 and be recorded there, both the amount of energy and the location 20 where the gamma ray 10 intersects the detector 14.

By operating both the aperture and detector plane layers 12, 14 in what is known as a "coincident mode" (narrow timing window), the event can be reconstructed and the direction of the incident gamma-ray 10 be determined to within an angular cone. This mode of operation is typical of that for a Compton telescope. Here the present invention uses a coded aperture as an upper or top Compton scattering plane in addition to using it as a conventional coded aperture.

At low gamma-ray energies (<0.3 MeV), the system operates as a conventional coded aperture system. The aperture 12 consists of opaque 22 and open or transparent 24 regions. Most interactions are photoelectric.

At higher energies (0.3 MeV<E<5.0 MeV), the aperture 12 becomes less opaque due to Compton interaction and pair production, and the gamma-ray telescope device of the present invention is operated as a Compton telescope.

An advantage of the present invention is good imaging performance at low energies (<0.3 MeV) by coded aperture, good imaging at higher energies (>0.3 MeV) by Compton scattering. The present invention also increases dynamic energy range, reduces system weight, and improves quality of image.

The foregoing disclosure and description of the invention are illustrative and explanatory thereof, and various changes in the size, shape and materials, as well as in the details of the illustrated construction may be made without departing from the spirit of the invention.

The invention claimed is:

1. A combined format gamma-ray detector for measuring impinging gamma-rays comprising:
   an active upper level coded aperture detector member suitable for detecting an impinging gamma-ray; and,
   an active lower level gamma ray detector plane member spaced apart from the upper level coded aperture for detecting an impinging gamma-ray;
   whereby at low gamma-ray energies, the combined format gamma-ray detector device operates as a conventional coded aperture system and at higher gamma-ray energies, the combined format gamma-ray detector device operates as a Compton scattering detector device.

2. The invention of claim 1 wherein the active upper level coded aperture detector member comprises a solid state detector.

3. The invention of claim 1 wherein the active lower level gamma ray detector plane member consists of material capable of detecting the energy of interacting gamma rays.

4. The invention of claim 1 wherein the active lower level gamma ray detector plane member detects an interaction point of an impinging gamma ray.

5. The invention of claim 1 wherein the active lower level gamma ray detector plane member detects an amount of energy deposited by an impinging gamma ray.

6. The invention of claim 1 wherein the active lower level gamma ray detector plane member is arranged within the gamma ray detector such that the active upper level coded aperture detector member is ahead of the active lower level gamma ray detector plane member relative to a path of travel for the gamma ray.

7. A method for detecting gamma-rays impinging upon a gamma-ray detector comprising the steps of:
   detecting lower energy gamma-rays utilizing the gamma-ray detector device in a coded aperture imaging device mode; and,
   detecting higher energy gamma-rays utilizing the gamma-ray detector device in a Compton scattering device mode;
   an active upper level coded aperture detector member suitable for detecting an impinging gamma-ray; and,
   an active lower level gamma ray detector plane member spaced apart from the upper level coded aperture for detecting an impinging gamma-ray;
   whereby the gamma-ray detector device includes an active upper level coded aperture detector member suitable for detecting an impinging gamma-ray; and, an active lower level gamma ray detector plane member spaced apart from the upper level coded aperture for detecting an impinging gamma-ray.

8. The method of claim 7 wherein the active upper level coded aperture detector member comprises a solid state detector.

9. The method of claim 7 wherein the active lower level gamma ray detector plane member consists of material capable of detecting the energy of interacting gamma rays.

10. The method of claim 7 wherein the active lower level gamma ray detector plane member detects an interaction point of an impinging gamma ray.

11. The method of claim 7 wherein the active lower level gamma ray detector plane member detects an amount of energy deposited by an impinging gamma ray.

12. The method of claim 7 wherein the active lower level gamma ray detector plane member is arranged within the gamma ray detector such that the active upper level coded aperture detector member is ahead of the active lower level gamma ray detector plane member relative to a path of travel for the gamma ray.

* * * * *